United States Patent [19]

Williamson

[11] Patent Number: 4,745,978
[45] Date of Patent: May 24, 1988

[54] MOUNTING ARRANGEMENT FOR A COULTER AND KNIFE

[76] Inventor: Gerald E. Williamson, 802 W. Jefferson, Macomb, Ill. 61455

[21] Appl. No.: 10,268

[22] Filed: Feb. 2, 1987

[51] Int. Cl.$^4$ ............... A01B 79/02; A01B 61/04; A01B 49/06
[52] U.S. Cl. ......................... 172/166; 111/7; 172/573
[58] Field of Search .............. 111/7; 172/573, 572, 172/166, 574, 763, 707, 602, 551, 264, 748

[56] References Cited

U.S. PATENT DOCUMENTS

| 2,906,353 | 9/1959 | Rogers | 172/166 X |
| 3,319,589 | 5/1967 | Moran | 172/573 X |
| 3,410,234 | 11/1968 | Peifer | 111/7 |
| 4,466,364 | 8/1984 | Hassenfritz | 111/7 |
| 4,538,532 | 9/1985 | Coker | 111/7 |
| 4,574,715 | 3/1986 | Dietrich | 172/166 X |
| 4,628,840 | 12/1986 | Jacobson | 111/7 |
| 4,656,957 | 4/1987 | Williamson | 111/7 |

FOREIGN PATENT DOCUMENTS 197809 9/1978 Canada ..................... 111/7

Primary Examiner—Richard J. Johnson

[57] ABSTRACT

A mounting arrangement for a coulter and knife which are mounted on separate collars on a vertical shank with the knife movable in the same vertical plane as the coulter including a locking mechanism which connects the mounting collars of the knife and coulter to ensure conjoint rotation of the knife and coulter about the vertical shank.

6 Claims, 2 Drawing Sheets

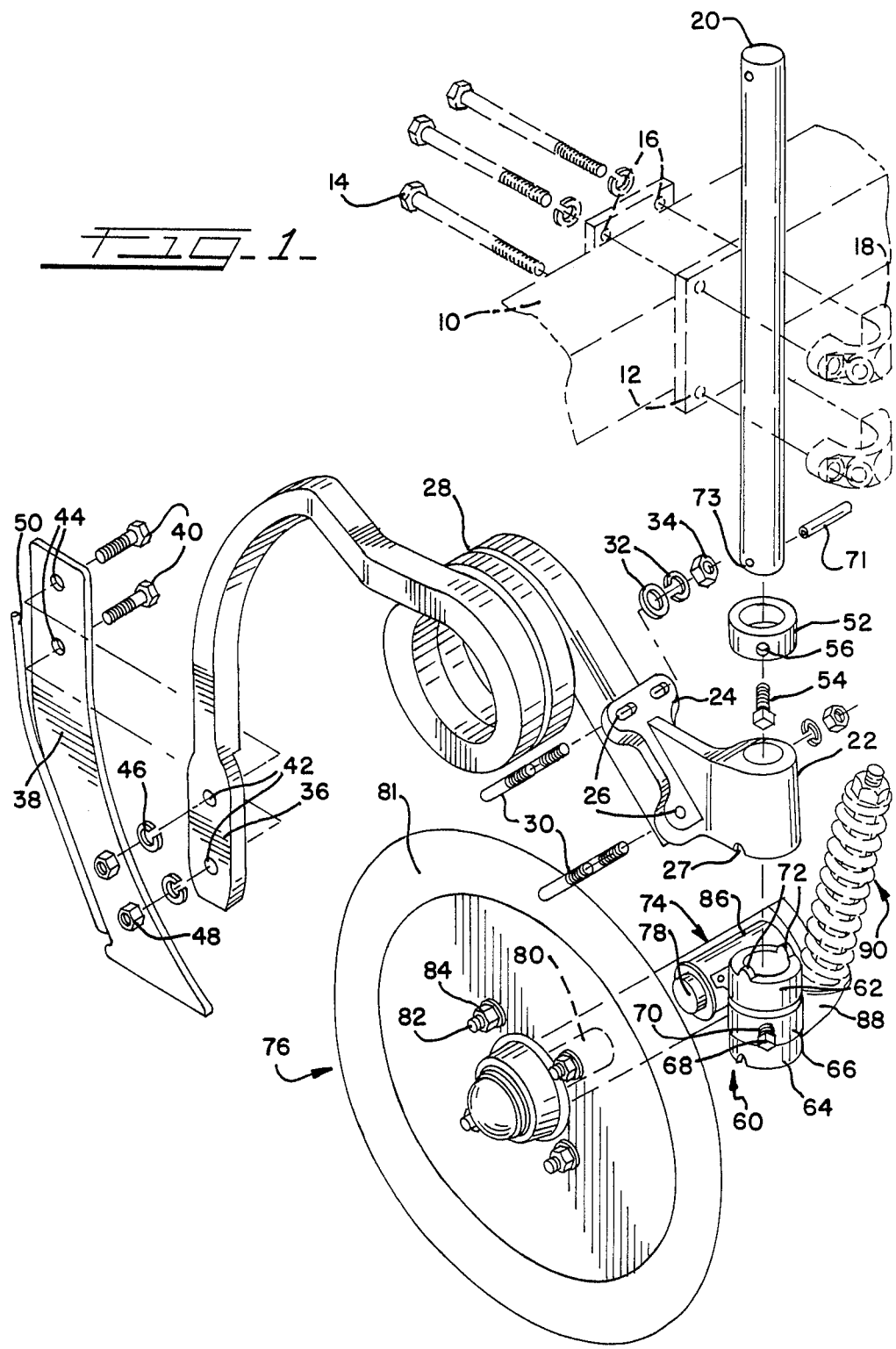

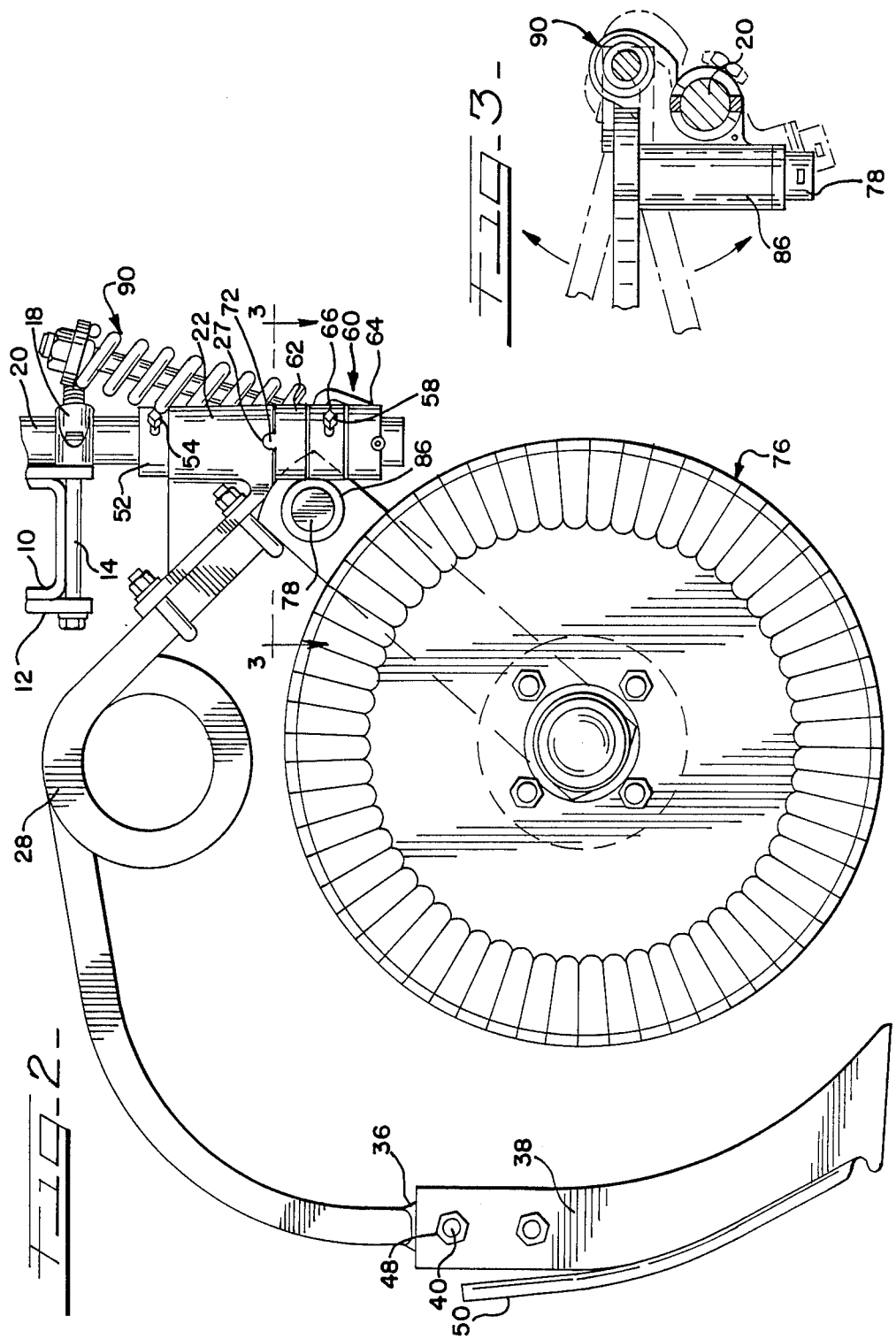

MOUNTING ARRANGEMENT FOR A COULTER AND KNIFE

BACKGROUND OF THE INVENTION

The present invention is directed to mounting arrangements for knives and coulter wheel assemblies which are sometimes used in the application of anhydrous ammonia. The knife and coulter are supported by and connected to portable tool bars. Numerous arrangements of this general type are shown in the prior art U.S. Pat. Nos., 2,722,902, 2,849,969, 2,924,187, 3,237,577, 3,296,985, 3,306,241, 3,410,234, 3,469,637, 3,745,944, 3,752,092, 3,799,079, 4,538,532 and 4,574,715. Problems have been encountered with these arrangements. When the soil is rocky, it is necessary to allow the coulter to pivot about the vertical shank on which it is mounted to prevent damage to the coulter. The prior art devices result in a side load on the knife when turns are made or an obstacle is struck often resulting in bending or breaking of the knife.

SUMMARY OF THE INVENTION

The present invention provides a mounting arrangement for knives and coulters which are separately mounted on a vertical shank with one mounting collar supporting a coil shank and knife blade and another mounting collar supporting a coulter blade assembly. A locking mechanism connects the mounting collars thereby providing conjoint rotation of the mounting collars, the knife and the coulter assembly about the vertical shank while permitting independent movement of the knife blade relative to the coulter wheel in the vertical plane of the wheel.

BRIEF DESCRIPTION OF THE DRAWINGS

FIG. 1 shows an exploded perspective view of the mounting arrangement.

FIG. 2 shows a side view of the mounting arrangement.

FIG. 3 shows a top view of a portion of the mounting arrangement and phantom views indicating the pivotal movement of the knife blade and coulter wheel about the shank.

DETAILED DESCRIPTION OF THE INVENTION

A mounting arrangement for a coulter and knife is shown in FIG. 1. The mounting arrangement includes a generally cylindrical vertical shank 20, which is attached to a tool bar 10, shown in phantom, which is pulled by a tractor. Plates 12, disposed on opposing faces of the tool bar 10, are secured by means of four bolts 14 which are inserted through corresponding apertures 16 in the plates 12 and threaded into clamps 18 which secure the vertical shank 20 to the tool bar 10.

A mounting collar 22 is sized to encircle and freely rotate about the vertical shank 20. The collar 22 includes a flange defining a bracket 24, which is provided with a plurality of apertures 26. The base of the collar 22 is provided with a pair of notches 27, one of which is shown in FIG. 1 with a corresponding counterpart disposed 180° from that location. A spring arm 28, shown in the form of a coil shank, is secured at one end to the bracket 24 by a pair of U-bolts 30 which are sized for insertion into the apertures 26 in the bracket 24. The U-bolts 30 are fastened in place by washers 32 and nuts 34. The opposite end of the coil shank 28 has disposed therefrom a substantially flat plate 36 onto which a knife 38 is attached. Bolts 40 are inserted through apertures 42 in the plate 36 and through corresponding apertures 44 in the knife 38. The bolts 40 are secured by means of washers 46 and nuts 48 fastening the knife 38 to the plate 36. A tube or conduit 50 may be secured to the rear of the knife 38 for application of a liquid fertilizer or anhydrous ammonia.

A locking collar 52 is associated with and located above the mounting collar 22 and is sized to encircle the vertical shank 20. The locking collar 52 is secured to the vertical shank 20 by means of a set screw 54 inserted through an aperture 56 provided therein. The locking collar is positioned above and adjacent the mounting collar 22 to prevent mounting collar 22 from moving up the vertical shank 20.

Another mounting collar 60, positioned below mounting collar 22, is sized to encircle and freely rotate about the vertical shank 20 and includes an upper portion 62 and a lower portion 64, best shown in FIG. 2, which are concentric and vertically spaced apart. A sleeve 66, sized to encircle the vertical shank 20, is positioned between portions 62 and 64, and is secured to the vertical shank 20 by means of a set screw 68 inserted through an aperture 70 in the face thereof. The sleeve 66 coacts with the mounting collar 60 so as to limit the rotation of the mounting collar 60 about the vertical shank 20. A roll pin 71 inserted through aperture 73 holds the mounting collar 60 in place and prevents loss of the coulter if the set screw 68 loosens.

The upper portion 62 of the mounting collar 60 is provided on its upper surface with lugs 72. As shown in FIG. 2, the lugs 72 correspond with and are sized for insertion into the notches 27.

A support arm 74 connects a coulter wheel assembly 76 to the mounting collar 60. The support arm 74 has a shaft 78 extending from one end and an axle 80 extending from the other end such that the shaft 78 and the axle 80 extend parallel to one another. The axle 80 is sized to receive and rotatably support a coulter wheel 81 which is secured by a plurality of bolts 82 and nuts 84.

A sleeve 86 is formed as an integral part of the mounting collar 60 and is sized to fit over the shaft 78 thereby connecting the support arm 28 and the coulter wheel assembly 76 to the mounting collar 60 for conjoint rotation. An outwardly extending flange 88 is attached to the mounting collar 60 and is provided with a spring assembly 90 to provide resiliency to the mounting arrangement.

Engagement of the notches 27 with the lugs 72 ensures conjoint rotation of the mounting collar 22 with the mounting collar 60 and correspondingly conjoint rotation of the knife 38 with the coulter 81. A slight clearance is provided between the lugs 72 and the notches 27 to allow slight movement between the mounting collars 22, 60 and their associated parts so that the knife 38 may be aligned with the coulter 81. This arrangement provides for independent movement of the knife 38 with respect to the coulter 81 in the vertical plane of the coulter while joining them for rotation about the vertical shank 20. Once the mounting collars 22 and 60 are positioned on the shank 20 with the lugs 72 engaging the notches 27 the locking collar 52 is secured in place abutting and adjacent the upper surface of the collar 22 preventing the collar 22 from moving upwardly on the shank 20 out of engagement with the collar 60.

The mounting arrangement of the present invention ensures conjoint rotation of the knife 38 and coulter 81 about the vertical shank 20 thereby reducing side load on the knife so that the knife 38 does not bend or break when turns are made or an obstacle is struck. Reducing side load permits the use of a thin knife instead of a wide knife. Independent movement of the knife 38 with respect to the coulter 81 in the vertical plane of the coulter permits the knife to be operated at a deeper depth than the coulter. Operating a thin knife at a deeper depth than the coulter prevents large clods and slabs of dirt in the field which result from using wide knives at the same level as the coulter, thereby alleviating further tillage before planting. Operating the knife 38 at a deeper depth than the coulter 81 also reduces the need for closing systems, such as covering discs, when applying gaseous substances to the soil because the opening formed in the soil is deeper and smaller so that the gas is less likely to escape.

Thus it has been shown that the present invention provides a mounting arrangement for a coulter and knife which provides conjoint rotation of the knife and the coulter about a vertical shank while at the same time permitting independent movement of the knife with respect to the coulter in the vertical plane of the coulter.

Various features of the invention have been particularly shown and described in connection with the illustrated embodiment of the invention, however, it must be understood that these particular arrangements merely illustrate and that the invention is to be given its fullest interpretation with the terms of the appended claims.

What is claimed is:

1. A mounting arrangement for a coulter and knife including a vertically disposed shank adapted to be connected to a portable frame and further adapted to support a coulter wheel assembly and a knife blade, a first mounting collar positioned on said vertical shank and rotatable with respect thereto, a coulter wheel assembly connected to said first mounting collar, a second mounting collar positioned on said vertical shank and rotatable with respect thereto, a spring arm secured at one end to said second mounting collar, a knife blade secured to and supported by said spring arm and located behind and aligned with said coulter wheel, locking means connecting said first mounting collar and said second mounting collar to provide conjoint rotation of said knife blade and said coulter wheel about said vertical shank.

2. A mounting arrangement for a coulter and knife as in claim 1 in which said locking means includes a notch provided in the lower portion of one of said mounting collars, and a lug provided on the upper portion of said other mounting collar, such that said notch and said lug may be placed in engagement with one another, ensuring conjoint rotation of said first mounting collar and said second mounting collar about said vertical shank.

3. A mounting arrangement for a coulter and a knife as in claim 1 in which said coulter wheel assembly includes a support arm having a first end connected to said first mounting collar and an axle extending laterally from a second end of said support arm and rotatably supporting a coulter wheel whereby said coulter wheel assembly is connected to said first mounting collar for conjoint rotation therewith.

4. A mounting arrangement for a coulter and a knife as in claim 3 including a shaft extending from said support arm parallel to said axle and a sleeve formed on said first mounting collar and positioned over said shaft thereby connecting said support arm to said first mounting collar.

5. A mounting arrangement for a coulter and a knife as in claim 1 including a locking collar associated with said second mounting collar positioned on said vertical shank to prevent said second mounting collar from moving up said vertical shank and to thereby secure said first and second mounting collars in locking engagement.

6. A mounting arrangement for a coulter and a knife as in claim 1 including a sleeve positioned on said vertical shank, said sleeve designed to coact with said first mounting collar to limit rotation of said first mounting collar, said coulter wheel and said knife blade about said vertical shank within predetermined limits.

* * * * *